United States Patent [19]

Bourbin

[11] Patent Number: 5,504,480
[45] Date of Patent: Apr. 2, 1996

[54] OPTICAL DEVICE AS A DRIVING AID

[75] Inventor: Yannic Bourbin, Chatenay Malabry, France

[73] Assignee: Valeo Equipements Electriques Moteur, Creteil, France

[21] Appl. No.: 340,279

[22] Filed: Nov. 15, 1994

[30] Foreign Application Priority Data

Nov. 17, 1993 [FR] France .................................. 93 13738

[51] Int. Cl.$^6$ .................................................. G08G 1/16
[52] U.S. Cl. .......................... 340/903; 340/435; 356/3.01; 362/61
[58] Field of Search .................................. 340/901, 903, 340/904, 905, 942, 435; 356/1, 3.01; 348/118, 149; 180/167, 169; 372/71; 362/61, 65

[56] References Cited

U.S. PATENT DOCUMENTS

| | | | |
|---|---|---|---|
| 4,383,238 | 5/1983 | Endo | 340/904 |
| 4,589,118 | 5/1986 | Suzuki et al. | 372/41 |
| 4,868,721 | 9/1989 | Soardo | 362/80 |
| 4,947,134 | 8/1990 | Olsson | 359/173 |
| 5,020,153 | 5/1991 | Choa et al. | 359/154 |
| 5,039,217 | 8/1991 | Maekawa et al. | 356/3.01 |
| 5,186,671 | 2/1993 | Nagasawa et al. | 219/121.66 |
| 5,189,619 | 2/1993 | Adachi et al. | 340/903 |
| 5,237,331 | 8/1993 | Henderson et al. | 356/5 |
| 5,249,157 | 9/1993 | Taylor | 340/903 |
| 5,314,037 | 5/1994 | Shaw et al. | 340/903 |
| 5,391,910 | 2/1995 | Fujimura et al. | 257/615 |

FOREIGN PATENT DOCUMENTS 4200057  8/1993  Germany .

OTHER PUBLICATIONS

French Search Report 21 Jul. 1994 pp. 64–66; and 123, "Solid–State Laser Engineering" by Walter Koechner. 1988.

*Primary Examiner*—Brent A. Swarthout
*Attorney, Agent, or Firm*—Morgan & Finnegan

[57] ABSTRACT

The present invention relates to an optical device used as a driving aid. According to the invention, a lidar is formed by a sample of glass doped with erbium and pumped by a fraction of the light flux generated by a xenon discharge lamp with a concentrator. The unit is disposed in a headlamp or other light, optionally making use of their lighting means, and enables a receiver and circuitry generating navigational aid parameters to be activated.

12 Claims, 3 Drawing Sheets

OPTICAL DEVICE AS A DRIVING AID

BACKGROUND OF THE INVENTION

The present invention relates to an optical device for use as an aid to driving, and is especially applicable to a motor vehicle. It makes use of technology known as "lidar" and is advantageously located in an indicator light or a headlamp of a vehicle.

The device uses at least one discharge lamp, of the kind filled with xenon or a gas of the same type, and generally utilizes technologies which have already been tested and are relatively widespread in the motor vehicle field, which make the application of the invention to this field possible.

The mounting of autonomous means for assisting navigation on board motor vehicles is regarded as an important developmental step with the aim of reducing the number of victims of traffic accidents.

Such autonomous means for assisting driving are for example described in DE 42 00 057, and are for example formed by information signalling means for the driver and/or means for controlling the speed of the vehicle.

Driving aids which are associated with the road infrastructure will also be involved in further development but are not the subject of this application.

A distinction can be made between active means and passive means when considering the autonomous means as a driving aid mounted on board the vehicle.

The latter generally call on optronic detection means, possibly with image formation and generally using bands placed in the near-infrared (0.8 μm<wavelength<2 m) or far-infrared (bands II and III). A certain number of technologies are possible at present, but few are able to keep to the price constraints imposed in the motor vehicle field.

For this reason the present invention deals with active driving assistance means. These active means call on a wider range of techniques involving acoustic, optical or radar waves. Applied to the field of motor vehicles and to anti-collision devices, these technologies are often reduced to telemetry, even if one may still consider measuring the relative speed of the obstacle by the Doppler effect.

These techniques impose constraints on several criteria which are decisive:

performance, spatial requirement, costs, integration in the vehicle, synergy with pre-existing devices, etc.

All weather utilization, particularly in fog or rain, will therefore be adopted for all radar devices.

Variations in the speed of sound, as a function of the atmospheric conditions, and also the greatest potential sensitivity to phonic pollution of ultrasound-based sensors, make them suitable for low performance solutions (reversing sonar for coaches, lorries, etc.).

The invention makes use of a technology known as "lidar". The spatial requirement and the directivity of the antenna of lidars is very advantageous owing to the fact that these result in greater simplicity of the signal processing. The technical problem resolved by the present invention lies in the adaption of this technology to the motor vehicle field so as to comply with the above-mentioned constraints.

More particularly, one of the essential aspects of the invention lies in the creation of a source for lidar which is compatible with these specific constraints.

From the possible candidates for the development of sources for lidars, the invention has sought solutions in the solid state for their greater reliability, their intrinsically lower production cost combined with a lower possession cost. The application of lidar, as an anti-collision device requires care to be taken to ensure ocular safety on leaving the pupil or laser antenna for evident reasons, which is a constraint that radar is totally free of.

In this connection, ocular damage is mainly of two types, i.e. corneal or retinal. Wave lengths greater than 2 μm are generally greatly absorbed by water or the substances making up the cornea and are therefore to be proscribed wherever possible. Inversely, those less than roughly 1 μm pass through the cornea and are focused on the retina, thus making the latter vulnerable to a too great energy or peak power. Luckily there is a fairly limited range where it is possible to use lasers without great damage to the eye and it is centered around 1.54 μm.

To illustrate these considerations, the maximum energy densities permitted are respectively 5 μJ/cm$^2$ and 1J/cm$^2$ to at 1.06 μm and 1.54 μm on entering the ocular pupil, which represents a dynamic range of 5 to 6 orders of magnitude.

The technological solutions in the solid state enabling emissions with ocular safety are at present as follows:

the semi-conductor laser diodes on the III–V InGuAsP/InP system and using electronic confinement structures with quantum wells. These components are still being developed and one should wait to see if their performance/cost relationship will considerably increase in the coming months or years;

RAMAN lasers; this is the case of a YAG laser doped with neodymium pumping a container of methane under pressure (30–50 bars) and enabling a transfer of energy on the first Stokes order (1.06 μm–>1.54 μm). Even if it is known how to make YAG Nd lasers in solid state, this solution nevertheless uses a pressurized gas with the latent risk of explosion in the event of an accident. This solution is expensive, and moreover its repetition frequency and lifetime is limited;

optical parametric oscillators (OPO), which are certainly a path opening up very vast horizons to designers and users. Bringing into play advanced non-linear optical concepts, technologically they represent the most perfect solution with regard to performance. But the materials which are likely to enter their composition are still difficult to control, and they would cost too much if large quantities were produced;

erbium lasers, which historically were the first to appear, which emit at 1.54 μm and of which it may be thought that they are at the origin of many ocular safety standards, both military and civil. Their pumping efficiency is maximum with xenon lamps and today an attempt is still being made to improve them significantly with power diodes at 908 nm, the structure of which both as regards optical index and electronic confinement call on materials restricted to quantum wells. As line production could not produce sufficiently low prices, it has not yet been produced; furthermore the xenon lamps will still be the pumping means for the Er$^{3+}$ ion which will be found for example in matrices of phosphate glass which are heat-resistant, possibly in the presence of the ions such as chromium, which, by energy transfer processes between electronic levels, contribute to a better pumping efficiency.

The dimensions of the lasers having rare earth ions such as neodymium or erbium may vary greatly, with cavities in the order of one meter or more, just like one millimeter in the case of so-called micro-chip lasers. The latter are today actively developed in the U.S.A. for their excellent spectral and modal properties which enable heterodyne detection, and thus the measurement of the relative speed of an obstacle in relation to a vehicle.

SUMMARY OF THE PRESENT INVENTION

The solution adopted by the invention for the creation of the source of the lidar lies in using a xenon lamp in order to pump small erbium, and possibly micro-chip, lasers.

According to an essential characteristic of the invention, which aims to comply with the above mentioned constraints in the field of motor vehicles, the invention uses a xenon lamp already present or easy to use in the vehicle.

In fact the present invention relates to an optical device as an aid to driving for a motor vehicle in particular, this device comprising:

- at least one generator of a laser beam in a determined direction having a wavelength and with an energy or a power compatible with ocular safety;
- at least one discharge lamp of the type comprising a rare gas, such as xenon;
- a sample of an optical material doped with erbium or with at least one dopant for bestowing the sample of optical material with qualities of stimulated light emission;
- an optical system for concentrating the light flux generated by the discharge lamp onto the sample of optical material;
- an optical system for the output of the laser beam;
- and a laser beam receiver.

Because of the present development of xenon discharge lamps, in the field of illumination for motor vehicles, the application of the invention to the field of motor vehicles is particularly advantageous and its nature is such that the inherent constraints of this field can be observed.

According to another characteristic of the invention, the device described above is placed in a headlamp of the vehicle. The advantages obtained by this characteristic are as follows:

- to ensure the protection of the laser in the enclosure of the headlamp;
- no opening in the vehicle body, nor any additional adjustment precaution is to be envisaged by the manufacturer to direct the energy used for the telemetry, which is not the case for hyperfrequency-type radar;
- since there are two headlamps in a car, these lidars may possibly be doubled to ensure more reliability or the performance may be increased by time-division multiplexing of the pulses;
- emission may also take place from one headlamp and detection may occur in another by using a heterodyne arrangement, by which it is possible to avoid blinding the detector when the pulse is released.

Furthermore it will be noted that the supply and means of pumping the laser are, in relation to devices not using a xenon discharge lamp as a source for the lidar, either "free" as they are already present in the headlamp, when it comprises such a discharge lamp for the illumination, or capable of being produced in such conditions and such quantities that their costs are made compatible with the market for motor vehicle equipment.

According to another characteristic of the invention, the doped optical material is a glass doped with erbium.

According to another characteristic of the invention, the laser beam receiver is formed by a photo-component based on AsGa or InP systems.

According to another characteristic of the invention, the laser beam receiver is formed by a laser generator, for example with material doped with erbium, operating as an amplifier and receiving the light emission induced by it laser illumination.

According to another characteristic of the invention, the device also comprises a control device determining the characteristics and the mode of operation of the generator and of the receiver.

According to another characteristic of the invention, it also comprises a detection device producing parameters as an aid to navigation, such as those based on the detection of energy retro-diffused or retro-reflected by a medium or a target disposed opposite at least the receiver, with it being possible to perform the operation of these measures in DOPPLER mode as well.

Navigational aid parameters may also be produced, such as:

- the presence of fog,
- the localization of targets such as the edges of the road or of nearby vehicles,
- the speed, the acceleration or the behavior either of the vehicle on board which the device is mounted, or of nearby vehicles, etc.

According to another characteristic of the invention, the discharge lamp is divided between the illumination function and the pumping function of the laser source, an optic being provided to produce an illumination light flux.

According to another characteristic of the invention, the laser beam also passes through the optic for producing the illumination light flux.

Other characteristics and advantages of the present invention will be better understood by means of the description and the attached drawings which are:

DESCRIPTION OF THE PREFERRED EMBODIMENTS

Figure 1:
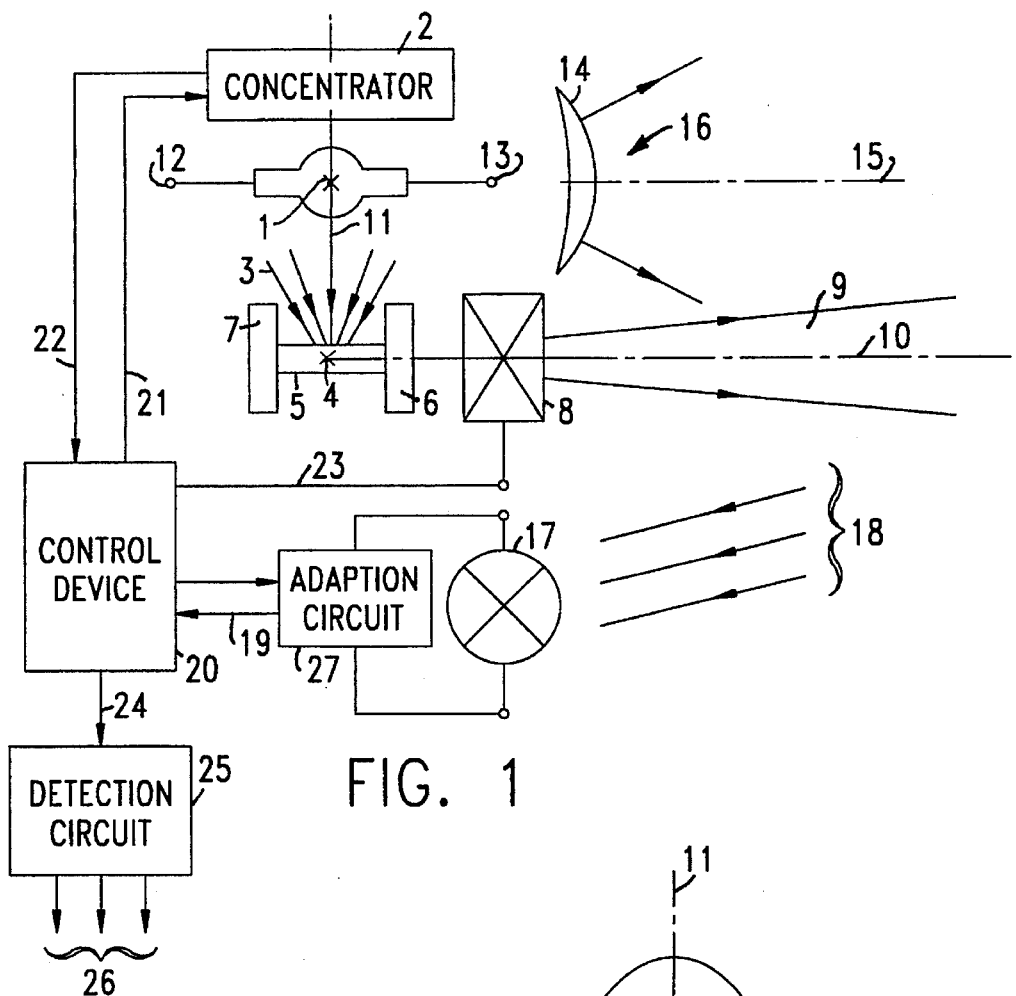
FIG. 1: a diagram of a first embodiment of a device of the invention.

In FIG. 1 a block diagram of an embodiment of the invention is represented.

According to the invention, a discharge lamp 1 is placed in front of a light flux concentrator 2, the light flux concentrator 2 having the effect of concentrating at least a part of the light flux 3 onto a focal point 4 on which is placed a sample of an optical glass capable of producing a stimulated light emission known by the name of laser. For this purpose an optical material, such as glass, doped with erbium or any other dopant for bestowing the sample of optical glass with stimulated light emission qualities, is chosen.

Conventionally, to produce the laser beam generator, according to the invention, the sample of optical glass bestowed with qualities of stimulated light emission is mainly formed by a bar of a glass with erbium 5 placed between a semi-reflecting mirror 6, disposed on the outlet side of the stimulated emission, and a reflective mirror 7 disposed on the opposite face so as to form a laser resonator.

The output beam of the laser beam generator is preferably transmitted through an optical system 8 for the output of the laser beam. The laser beam 9 has a central axis 10 which is perfectly determined as a function of the axis of the laser resonator 5–7.

The discharge lamp 1 is supplied between its terminals 12 and 13 by an appropriate electronic device (not shown), well known to a person skilled in the art.

The discharge lamp is preferably formed by a lamp filled with xenon gas which is used as means for pumping the $Er^{3+}$ ion which can be found in phosphate glass matrices, possibly in the presence of other ions, such as chromium, in order to improve the pumping efficiency.

The discharge lamp may be a lamp for vehicle illumination or a lamp of the same commercially available type, which makes it possible to perform the present invention without high investment being required.

The discharge lamp may be a specialist lamp for pumping the laser or may be formed by the discharge lamp which is used as a light source for a headlamp or an indicating light inside which the laser beam generator is disposed.

In this latter case, the concentrator 2 may be formed by a zone of the reflector which has already disposed in the headlamp or the light. For this reason, the means of the invention only bring about a slight increase in the parts already used in an illumination headlamp or an indicator light.

An optic 14 for producing an illumination light flux 16 along axis 15 has been represented, in particular in the case in which the discharge lamp is divided between the illumination and pumping function.

In an embodiment, the laser beam 9, 10 also passes through the optic 14.

According to the invention, the optical device also comprises a receiver 17 of a laser beam 18 which has terminals which are provided at the input to a signal detection and adaptation circuit 27. The output 19 of the signal detection and adaptation circuit is transmitted to a control device 20 which is intended to control the operation of the driving aid device of the invention.

In particular, the control device 20 comprises a control output 21 for regulating the pumping light flux 3 as a function in particular of the mode of operation of the discharge lamp 1, of the state of the concentrator 2, previously detected by a status signal 22 produced by a transducer (not represented) and returned to an appropriate input of the control device 20.

The receiver 17 of the laser beam 18 is, in a preferred embodiment, formed by a photo-component capable of transforming the physical characteristics of the incoming laser beam 18 into an electrical signal representative of the said characteristics.

The control device also comprises a control output 23 of the optical output system 8 of the laser beam generator. In particular, in a preferred embodiment the optical output system 8 is formed by a POCKELS cell, or a modulator device of the same type, which may in particular be used as a controlled optical valve.

The control device 20 finally comprises an output 24 which is transmitted to the input of a detection device 25, in particular formed by a specialized circuit (such as a signal processor commercially known under the initials DSP for Digital Signal Processor), or by a programmable microcontroller.

At output 26 the detection device 25 produces signals representative of navigational aid parameters, transmitted to output circuits which can act on comfort or safety devices of the vehicle, such as an overriding braking circuit, a circuit for controlling the throttle valve of the carburetor, an automatic pilot circuit etc. or which can act on alarm devices such as message calls, indicator lamps, or messages appearing on the display of the computer mounted in the vehicle.

Figure 2:
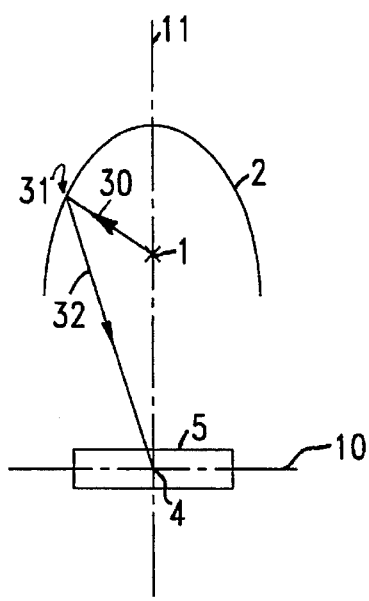
FIG. 2: a diagram of an embodiment of a generator of a laser beam.

In FIG. 2, an embodiment of a concentrator adapted to the laser beam generator according to the invention is shown. Such a concentrator 2 has a focal axis 11 on which a first focal point and a second focal point 4 are located, in the center of which the discharge lamp and the glass bar 5 are respectively placed. By choosing an elliptical reflector, a ray 30 emitted by the lamp onto the focal point 1 is reflected at point 31 of the reflector into a reflected ray 32 which arrives at the focal point 4 on the bar of glass doped with erbium 5. The laser beam is produced in the direction 10 through the semi-reflective mirror 6 (not shown in FIG. 2).

Figure 3:
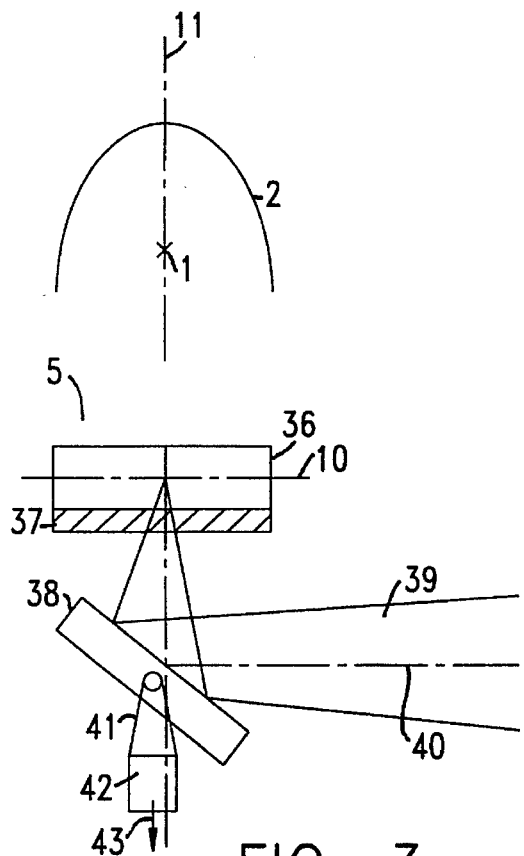
FIG. 3: a diagram of another embodiment of a generator of a laser beam.

In FIG. 3 another embodiment of a laser beam generator according to the invention is shown. In the figure the same components as those in the preceding figures have the same reference numbers and will not be described in further detail.

In this embodiment, the discharge lamp is placed on the focal point 1 and the pumping radiation passes through the surface of a sample of material, such as glass 36, doped with erbium, which is covered on its output face with a layer of an absorbent element which can be saturated at the laser emission wavelength.

The semi-absorbent substance deposited on the output face of the disk 36 enables an optical resonator to be formed with its input face. A mirror 38 is also used to produce output radiation of stimulated light 39 with axis 40. In this embodiment, it may also be specified that the reflecting mirror 38 be mounted so that it swivels on a support 41 controlled by an electromechanical system 42 which receives control information 43 from the control device 20. Such an electromechanical system may use a piezo-electrical effect to perform a micro-sweeping of the beam 39.

In an embodiment of the invention, the receiver is not formed just by a photo-component but also by a laser beam generator, similar to those in the embodiments of FIG. 1 and 2, but operating as an amplifier.

In this embodiment, the laser beam passes through the erbium glass bar to produce a secondary emission of light flux, the characteristics of which are a representation of the optical characteristics of the laser beam received.

In this case, a sensor of the secondary light flux emitted is used to detect a representative signal of the optical characteristics of the laser beam received.

Figure 4:
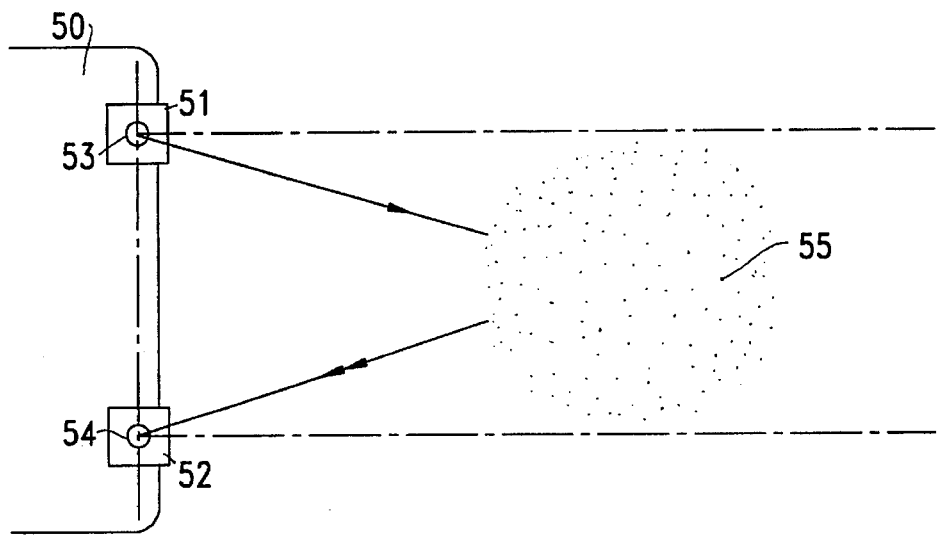
FIGS. 4 and 5: diagrams for the application of the device of the invention to the motor vehicle field.
Figure 5:
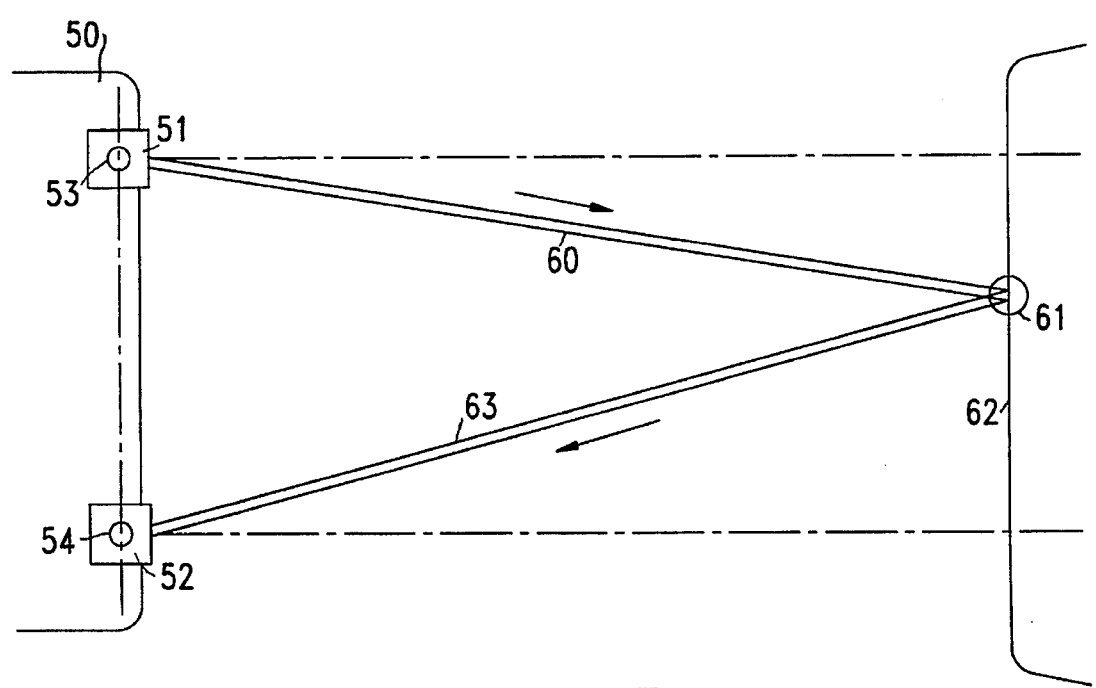

In FIGS. 4 and 5 two functions of the navigational aid device when it is installed in the headlamps of a vehicle are represented.

However the invention does not exclude the case in which the laser beam is produced either by a fixed terminal disposed on the edge of the road, for example, or by a generator mounted on board a nearby vehicle.

In FIG. 4 is represented a vehicle 50 which has two illumination headlamps 51 and 52 each equipped with a laser generator 53 and a laser detector 54. In front of the vehicle is a zone of fog 55 which is retro-diffusing for the wavelength range produced by the generator 53.

By synchronous demodulation in the detection device 25 in FIG. 1, by means of a fog detection circuit it is possible to generate a fog detection signal, in particular to light up a fog lamp.

In FIG. 5 an embodiment of the invention used in telemetry is represented. The laser generator mounted on board the vehicle 50 produces an incident beam 60 which comes to strike a rear zone 61 of a vehicle 62. The reflected beam 63 is detected by the detection photo-component 54 and the detection circuit 25 enables the inter-vehicular distance and possibly the relative speed, the change of traffic lanes, etc to be derived. From these parameters alarm signals may be derived in the event of brutal deceleration, for example.

In other applications, the emitted laser beam is directed onto the surface of the road in front of the vehicle in order to detect:

the state of the road, the presence of black ice, etc.

According to the invention, the detection circuit is programmed so that it can operate in DOPPLER mode. In this case, a sequence of laser light signals can be produced and the frequency translation of the sequence of laser light signals received can be observed in order to derive therefrom information regarding speed, then, by integration, information regarding position.

The control device 20 enables the laser generator to be operated in continuous mode or in pulse mode:

either by controlling the ignition of the pumping discharge lamp, or the optical state of the concentrator, or by controlling the optical characteristic of the output system 8.

Figure 6:
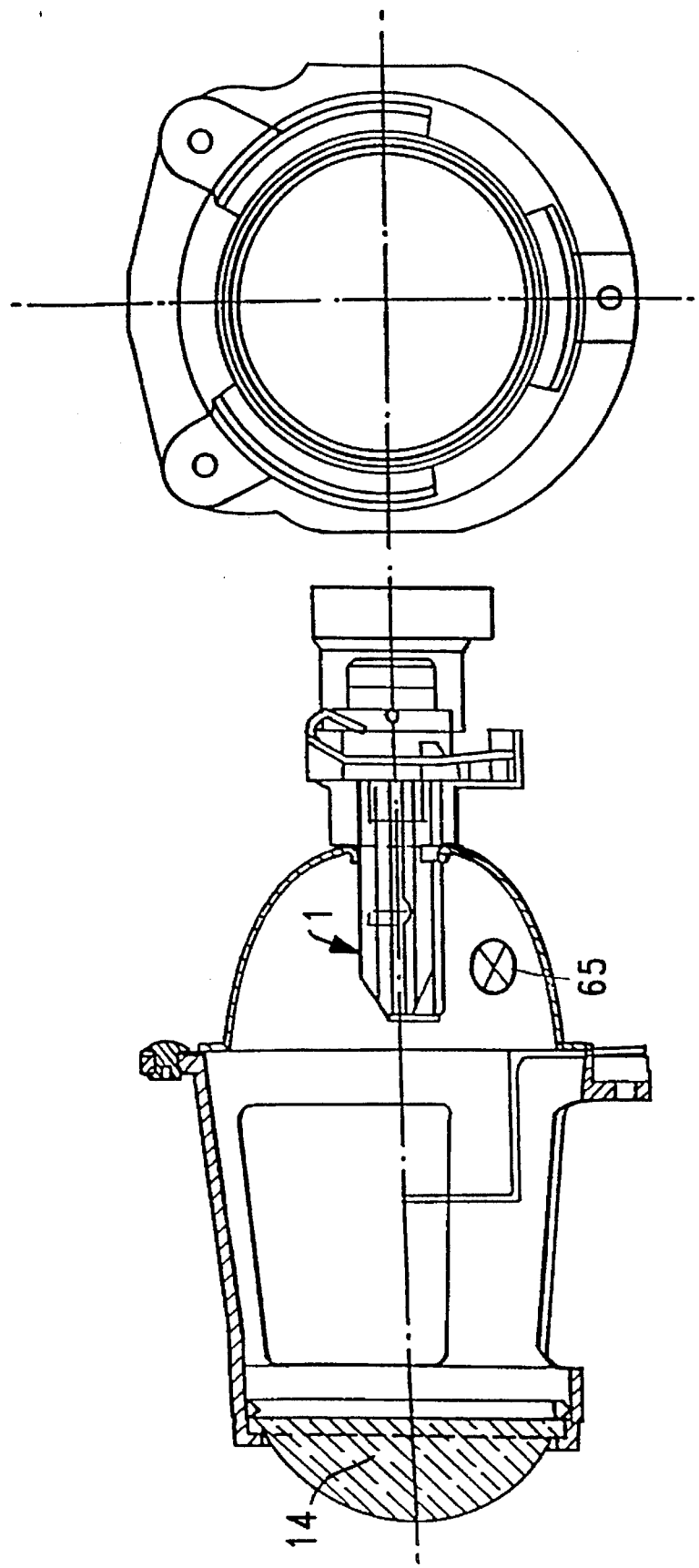
FIG. 6: a diagram of an illumination headlamp suitable for receiving a laser generator according to the invention.

In FIG. 6 two views are shown, respectively a side view and front view of an illumination headlamp incorporating a discharge lamp 1 and an output optical device 14. A part of the light flux is returned towards the laser generator 65 disposed inside the headlamp.

While the invention has been described in conjunction with several specific embodiments, it is evident to those skilled in the art that many further alternative modifications and variations will be apparent in the light of the foregoing description. Thus the description described herein is intended to embrace all such alternatives, modifications, applications and variations as may fall within the spirit and scope of the appended claims.

What is claimed:

1. An optical device intended as a driving aid for a motor vehicle, comprising:

at least one generator disposed in a vehicle headlamp and operable to generate a laser beam in a pre-determined direction having a wavelength and an energy or power compatible with ocular safety;

said laser beam output through a first optical system;

at least one discharge lamp of the kind comprising a rare gas, said discharge lamp capable of pumping said generator and acting as a non-laser illumination source for said vehicle headlamp;

at least a portion of light flux generated by the discharge lamp output through a second optical system;

a sample of an optical material doped with erbium or with at least one dopant intended to provide the sample of optical material with qualities of stimulated light emission;

a third optical system for concentrating at least part of the light flux generated by the discharge lamp on the sample of optical material to pump said generator; and a laser beam receiver.

2. The device according to claim 1, wherein said generator is disposed in a first headlamp, and said receiver is disposed in a second headlamp.

3. The device according to claim 2, wherein said receiver makes use of a heterodyne arrangement.

4. The device according to claim 1, wherein the doped optical material is a glass doped with erbium.

5. The device according to claim 1, wherein said laser beam receiver is formed by a photo-component comprising GaAs or InP.

6. The device according to claim 1, wherein the receiver of the laser beam is formed by a laser generator, having material doped with erbium, operating as an amplifier and receiving the light emission induced by its laser illumination.

7. The device according to claim 1, further comprising a control device adapted to determine the characteristics and the mode of operation of the generator and of the receiver.

8. The device according to claim 1, further comprising a detection device producing navigational aid parameters, including those based on the detection of energy retro-diffused or retro-reflected by a medium or a target disposed opposite at least the receiver, it being possible to perform the operation of the detection device in Doppler mode.

9. The device according to claim 1, further comprising an optic for producing an illumination light flux.

10. The device according to claim 9, wherein said laser beam also passes through the optic for producing the illumination light flux.

11. The device according to claim 1, wherein said receiver is disposed in a vehicle headlamp.

12. The device according to claim 1, wherein said sample of optical material comprises an output face for outputting said laser beam and an opposing face, and said generator further comprises a semi-reflective mirror disposed on said output face and a reflective mirror disposed on said opposing face.

* * * * *